No. 834,779. PATENTED OCT. 30, 1906.
S. W. WARDWELL.
CONTROLLING DEVICE.
APPLICATION FILED JAN. 13, 1906.

2 SHEETS—SHEET 1.

No. 834,779. PATENTED OCT. 30, 1906.
S. W. WARDWELL.
CONTROLLING DEVICE.
APPLICATION FILED JAN. 13, 1906.
2 SHEETS—SHEET 2.
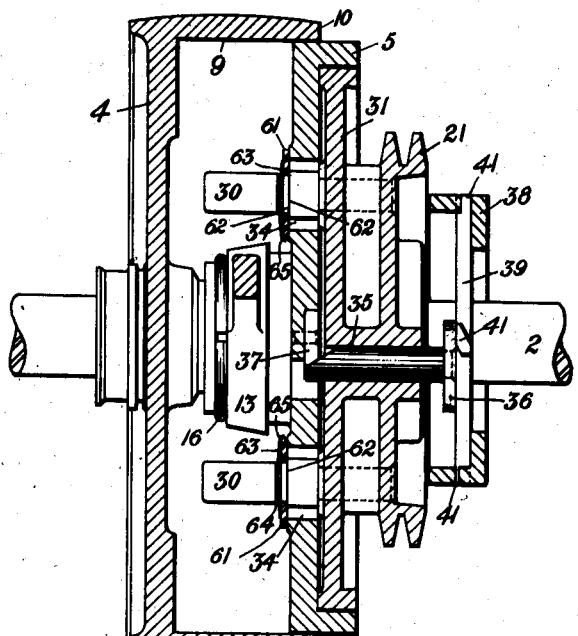
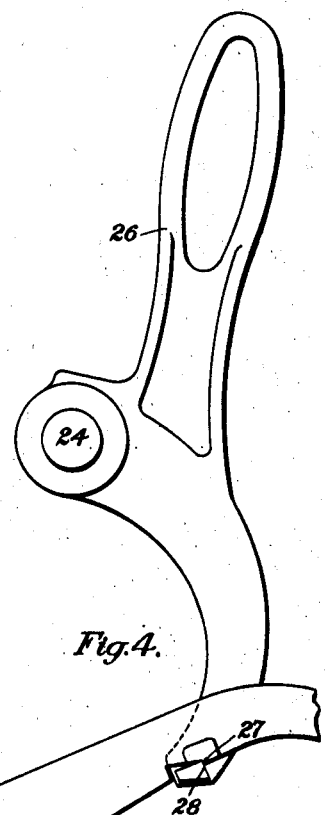
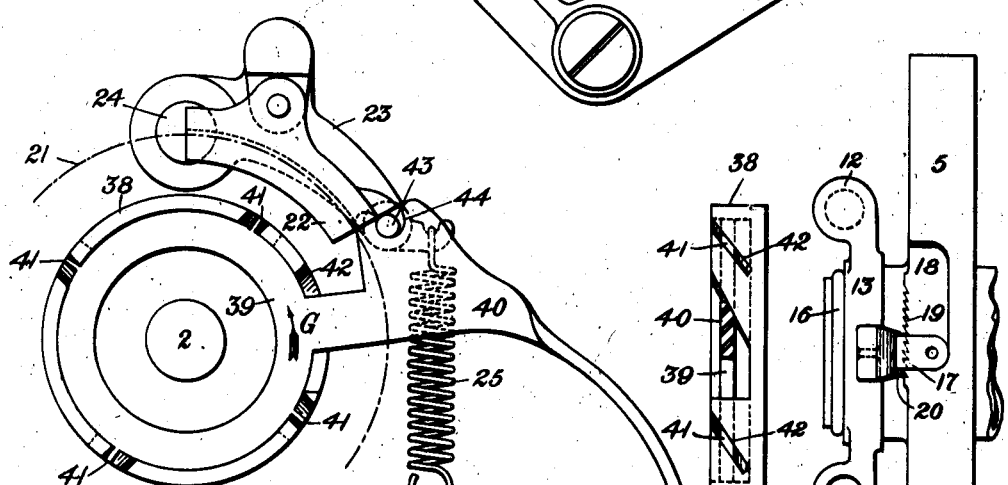
WITNESSES
INVENTOR.
BY
ATTORNEYS

UNITED STATES PATENT OFFICE.

SIMON W. WARDWELL, OF PROVIDENCE, RHODE ISLAND.

CONTROLLING DEVICE.

No. 834,779.  Specification of Letters Patent.  Patented Oct. 30, 1906.

Application filed January 13, 1906. Serial No. 295,917.

*To all whom it may concern:*

Be it known that I, SIMON W. WARDWELL, a citizen of the United States, residing at Providence, in the county of Providence and State of Rhode Island, have invented certain new and useful Improvements in Controlling Devices, of which the following is a specification.

My invention is an improved controlling device, and its purpose is to provide means for starting a rotating member, or machine of which such member forms a part, gradually, with acceleration, until its full speed is attained; further, means for regulating or adjusting the rate of acceleration, with means for manually operating or controlling the operation of said member.

The accompanying drawings, which form a part of the specification, represent, respectively, in—

Figure 1:
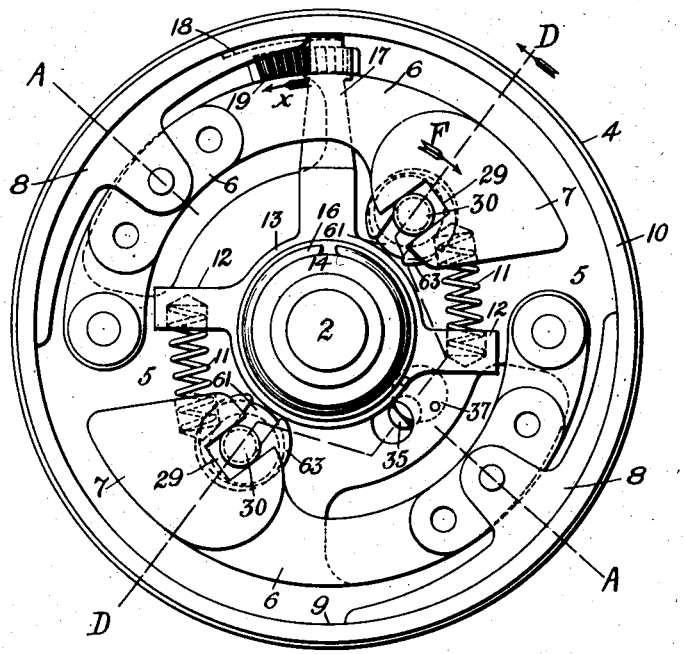
Figure 2:
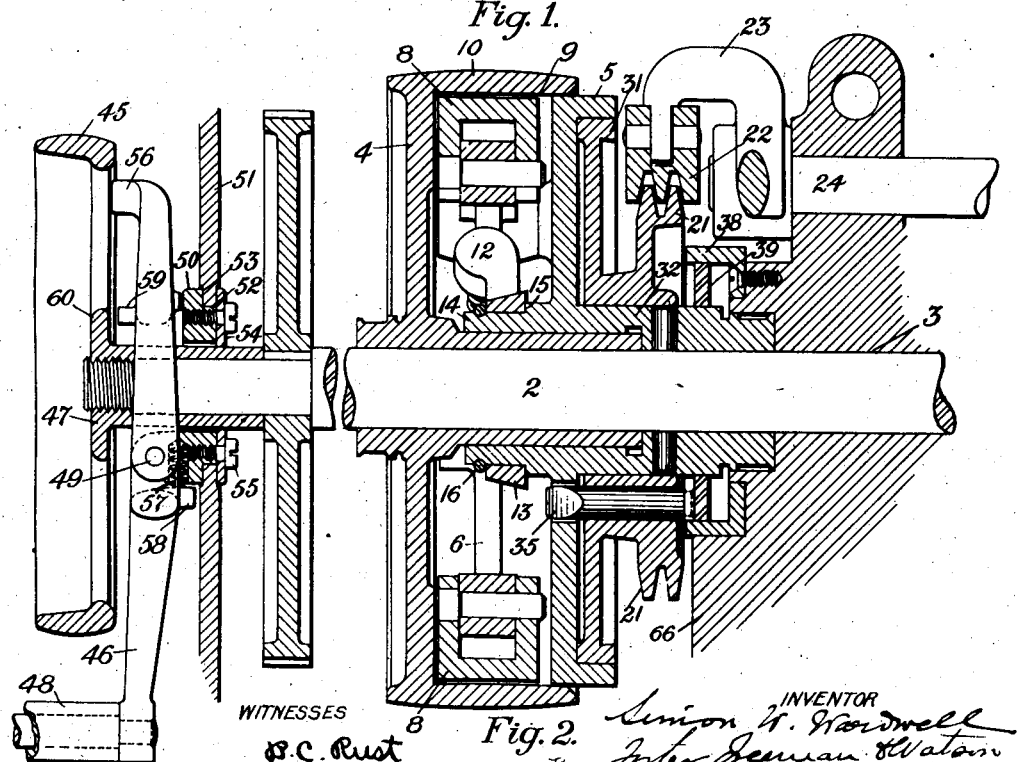

Figure 1, an elevation of my device; Fig. 2, a section on the line A A of Fig. 1; Fig. 3, a section on the line D D of Fig. 1; Figs. 4, 5, 6, and 7 details of the structure.

Referring to Fig. 2, the shaft 2 rotates in bearings of its machine, one of which is represented by 3. On this shaft is freely rotatable a loose pulley or wheel 4, which turns continuously and which may be rotatively connected with said shaft by the following instrumentalities: Adjacent the pulley 4 and partially within its rim is a disk 5, on which are fulcrumed the arms or levers 6 6, having weighty extremities 7 7.' Attached to each lever is a friction-shoe 8, which shoe is pressed radially outward against the inner surface 9 of the rim 10 of the pulley 4 by the spring 11 acting between the extremity 7 of the lever 6 and the lug 12. The pressure of the spring 11 is such as to cause sufficient frictional engagement between the shoe 8 and the rim 9 to start the disk 5 rotating slowly, and with it the shaft 2. Rotation immediately sets up in the levers 6 6 centrifugal action, which, augmenting the pressure of the springs 11 11 and intensifying the frictional engagement of the shoes 8 8 with the pulley-rim 10, causes both pulley 4 and disk 5 to finally rotate as one.

The resilient intensity of the springs 11 is varied by rotatively changing the relation of the lugs 12 with reference to the levers 6. The lugs 12 are radial projections from a ring member 13, mounted on the hub 14 of the disk 5. It is held on said hub between a shoulder 15 of the hub and a ring 16, sprung into a groove in said hub after the ring 13 has been set in place thereon. Extending from the ring 13 is a third radial projection or arm 17, which reaches to the rim of the disk 5 and is then turned at right angles to enter a recess or pocket 18 in the rim of said disk. (See Fig. 7.) On the face of the disk adjoining the pocket 18 are formed ratchet-teeth 19, with which there engages the pawl projection 20 of the arm 17. The elasticity of the arm 17, which is preferably formed of spring metal and riveted to the ring 13, holds its pawl projection 20 in engagement with the teeth 19 aforesaid. By moving the arm 17 in the direction of the arrow *x* of Fig. 1 the lugs 12 are caused to approach the irrespective arms 6, compressing the springs and increasing their pressure. By the reverse movement the action of the springs is lessened. Obviously the greater the spring action the heavier the load that can be started by the pulley and the more quickly can any load be started, and, further, having once been started the more rapid is the rate of acceleration until full speed is attained.

In devices of this character it is usual to embody a brake to instantly arrest movement of the actuated member when the machine is stopped. There are various well-known forms of brake mechanism, so that none will be described in detail, but only sufficient portions of a known structure to carry out this description.

Secured to the shaft 2 is a brake wheel or disk 21, in this instance a part of an appurtenance to the disk 5. Adjacent the brake-wheel 21 is a brake-shoe 22, carried on an arm 23, which projects from a rod or bar 24. Preferably both brake-shoe and brake-wheel are formed with interentrant grooves and rings. The brake-shoe is under the action of a spring 25, (see Fig. 5,) which tends to engage it with the brake-wheel 21 and does so engage it when the machine is stopped. While the machine is in operation, the brake-shoe 22 is lifted away from its wheel by the handle 26 (see Fig. 4) and held away by a lock 27, which engages a shoulder 28 of the said handle.

Under certain conditions it is desirable to rotate the shaft 2 manually, and this can be practically effected only when the brake-shoe 22 is withheld from its wheel 21, for when the two latter engage their mutual friction prevents or resists rotation. If the brake-shoe is in the least removed from its wheel, then the springs 11 act on the friction-shoes 8 to cause engagement with the belt-driven pulley d.

The desired result is secured by positively withdrawing the friction-shoes 8 from engagement with the pulley 4, leaving the brake-shoe 22 out of engagement with its wheel 21 as though the machine were running.

Referring to Fig. 1, the weighted extremity 7 of each arm 6 has a recess 29, within which is a pin 30, engaging the sides of the recess. Revolution of the pin 30 about the shaft 2 in the direction of the arrow F draws the arm 6 toward the shaft 2 and the friction-shoe 8 away from the pulley 4, thus operatively disconnecting it from the shaft.

The pins 30 are secured to the member 31, of which the brake-wheel 21 is a part, as shown in Fig. 3, which member 31, as shown in Fig. 2, is mounted on the hub 32 of the disk 5, the rim of the latter disk extending over and to the edge of the rim of the member 31. As shown in Fig. 3, the pins 30 extend through openings 34 in the disk 5 into the interior of the pulley 4 to engage the arms 6 6.

The pins 30 have another function, in that they retain the member 61 in position on the hub of the disk 5. This is accomplished by providing washers 61 61, abutting shoulders 62 62 on the pins 30 and adapted to extend across the openings 34 and bear on suitable bosses on the inner face of the disk 5. The washers 61 are held against the shoulders on the pins 30 by U-shaped springs 63 63, straddling the pins 30 and entered in peripheral grooves 64 in the pins. The springs are slightly bowed to give them the required tension and their ends 65 are preferably hooked to lap over the edges of the washers to retain the springs in position.

Through the member 31 extends a slidable pin or bar 35, having, preferably, a head 36 of extended bearing-surface. The opposite end of the pin is beveled or tapered, said beveled surface engaging a hardened contact-piece 37, secured to the disk 5. If the pin 35 is pushed toward the interior of the pulley 4, it will obviously exert a wedging action on the disk 5 and the member 31, causing the latter to rotate on the disk 5 in the direction of the arrow F, shifting the pins 30 in the same direction and withdrawing the friction-shoes 8 from the interior rim-surface of the pulley 4.

The pin 35 is longitudinally shifted by the following instrumentalities: Secured to the machine-frame 66 is a cup-shaped member 38, mounted concentric with the shaft 2. Within this is a plate 39, having an arm 40, Fig. 5, and projections 41, which projections are adapted to engage cam-surfaces 42, formed in the rim of the cup 38, Fig. 6. When the arm 40 is raised or moved in the direction of the arrow G, Fig. 5, the plate 39 is moved away from the frame of the machine, due to the coaction of the cam-surfaces 42 and the projections 41, and toward the pulley 4, causing the pin 35, whose head bears on the plate 39, to act on the member 31 in the manner above described.

Referring to Fig. 5, it will be observed that the arm 23 has a projection 43 and that the arm 40 has a recess 44, that is engaged by said projection. The said recess is so formed that when engaged by the projection 43 the arm 23 is locked in its up position with the brake-shoe 22 away from its wheel 21, and arm 40 is also held up. This is so that when the brake 22 is upheld by the handle 26 and instrumentalities described the arm 40 can be locked up, leaving the shaft 2 free to be operated manually, and when the brake is down on its wheel to prevent the shaft's rotation to raise it coincidentally with the raising of the arm 40 and lock both the brake 22 and the friction-shoes 8 in their non-active positions, while the shaft 2 is manipulated as desired.

Means for manually operating the shaft 2 are provided in the hand-wheel 45 and the handle-lever 46. (See Fig. 2.) The wheel 45 has an internally-threaded hub 47, that screws onto the threaded end of the shaft 2. When only one or two turns or fractions of a turn of the shaft must be made, the wheel alone may be employed.

When several turns must be made, recourse is had to the handle-lever 46, which is fulcrumed by the pin 49 to the revoluble ring 50. This ring is preferably mounted revolubly in the casing or frame 51. As indicated, the ring has a reduced portion 52 and a shoulder portion 53. A retaining-plate 54, opposed to the shoulder 53 and secured to the ring by screws 55 or rivets, holds the ring in position in the casing. The lever 46, to which the handle 48 is attached, has a projection 56 to engage the arm of the wheel 45 and a spring 57 to normally hold it out of said engagement. The spring 57 is in a pocket in the ring 50 and bears on a part 58 of the lever 46.

When it is desired to manually rotate the shaft by the handle 48, the latter is pushed toward the machine or toward the pulley 4 until the stop 59 of the lever 46 strikes the web 60 of the wheel 45, when the projection 56 is moved within the plane of the arms of the wheel 45 and rotation of the lever 46 is imparted to the wheel 45 in either direction.

The invention above described is devised for controlling the winding operations of coiling insulated wire, particularly in producing electrical coils for electromagnets, electrical instruments, and the like. In this class of work extreme care must be exercised throughout the winding operation to see that it is properly commenced, properly conducted, and properly terminated. It is usually necessary to commence the winding at some particular point, and therefore the winding-machine is manually operated to bring the winding-guide exactly to that point. Sometimes conditions arise where it is desirable or essential to wind several coils manually. During the course of the winding, if imperfections occur in the wire necessitating splicing then the machine is manually operated to pass the splice by the winding-guide. In cases where extreme care as to the number of coils wound is necessary it is usual to stop the machine at less than the number desired and complete the winding manually.

Insulated wire must be unwound from its supply rotatively and, being extremely heavy, is particularly subject to inertia. Therefore must the winding operation be started slowly and with gradual acceleration be brought up to full speed.

It is to meet the above conditions that the above-described device has been invented.

Without limiting myself to the precise construction or arrangement above indicated, I claim—

1. In a controlling device, the combination of a shaft and a wheel or pulley rotatable on said shaft, with means initially spring-actuated, to impart to the shaft, with gradual acceleration, the motion and speed of the pulley, said means having weights adapted to be acted on by centrifugal force, due to rotation of the shaft in either direction, to gradually and finally impart said pulley speed.

2. In a controlling device, the combination of a shaft and a wheel or pulley rotatable on the shaft, with means, initially spring-actuated, to impart to the shaft, with gradual acceleration, the motion and speed of the pulley, said means being weighted to adapt them to be acted on by centrifugal force, due to the rotation of the shaft in either direction to gradually and finally impart said pulley speed, and means to withdraw said imparting means from coaction with said pulley.

3. In a controlling device, the combination of a shaft and a wheel or pulley rotatable on the shaft, with means, initially spring-actuated, to impart to the shaft, with gradual acceleration, the motion and speed of the pulley, said means having weights controlled by centrifugal action, due to the rotation of the shaft in either direction to gradually and finally impart said pulley speed, and means to withdraw said imparting means from coaction with the pulley during the rotation of the shaft.

4. In a controlling device, the combination with a continuously-rotating member and a member at rest, of springs mounted on the still member, and means also on the still member pressed by the springs to frictionally engage and cause a slow rotation of the still member, said means having weights acted on by centrifugal force due to rotation of said still member in either direction for gradual and full frictional engagement to gradually impart to the still member the full speed of the rotating member.

5. In a controlling device, the combination with a continuously-rotating pulley 4 and shaft 2, of a disk 5 secured to the shaft, friction-shoes 8 carried by said disk, springs 11 carried by the disk to frictionally engage the shoes 8 with the pulley, and arms 6 having weighted extremities to increase said frictional engagement by their centrifugal action when rotated with the disk 5 by the pulley 4.

6. In a controlling device, the combination with a continuously-rotating pulley 4 and a shaft 2, of a disk 5 secured to the shaft, friction-shoes 8 carried by said disk, springs 11 carried by the disk to frictionally engage the friction-shoes 8 with the pulley, means to adjust the degree of action of the springs, and arms 6 to increase said frictional engagement by their centrifugal action when rotated with the disk 5.

7. In a controlling device, the combination with a continuously-rotating pulley 4 and a shaft 2, of a disk 5 secured to the shaft and having teeth 18, a member 13 movably mounted on the disk 5 and having an arm 17 that engages said teeth, and lugs 12, arms 6 on the disk 5, springs 11 between said lugs 12 and arms 6, and friction-shoes 8 adapted to be pressed by the springs into frictional contact with the pulley and, by the centrifugal action of the arms 6, in gradually greater frictional contact due to the rotation of the disk 5.

8. In a controlling device, the combination with a continuously-rotating wheel 4, and a shaft 2, of friction means to engage the wheel with the shaft to cause the rotation of the shaft in either direction, springs to cause an action of said means, and centrifugally-acting means to cause an action of the friction means greater than that caused by the springs.

9. In a controlling device, the combination with a continuously-rotating wheel 4 and a shaft 2, of friction means to engage the wheel with the shaft to rotate the latter in either direction, springs to cause an action of said means, centrifugally-acting means to cause an action of the friction means greater than that caused by the springs, and means to withdraw the friction means from engagement with the pulley.

10. In a controlling device, the combination with continuously-rotating wheel 4 and a shaft 2, of friction means to rotatively engage the wheel with the shaft, springs to cause an action of said means, centrifugally-acting means to cause an action of the friction means greater than that caused by the springs, means to withdraw the friction means from engagement with the wheel, and means to lock said means in their disengaged position.

11. The combination with a rotating pulley and a shaft 2, of a disk 5 having a grooved hub, a member 13 with an arm 17, friction means to connect the pulley and the disk 5, springs interposed between the ring 13 and said friction means, a spring-ring 16 sprung into the groove of the hub aforesaid to hold the member 13, and means to hold the arm 17 in whatever position it is moved to.

12. The combination of a shaft, a wheel rotatable independently thereof, intermediate means carried by one part to frictionally engage the other to rotate it in either direction, and springs for insuring said frictional engagement, said means also arranged to move under centrifugal action to increase the friction in proportion to the increase of speed of rotation of the parts.

13. The combination of a shaft, a wheel rotatable independently thereof, intermediate means carried by one part to frictionally engage the other to rotate it in either direction, springs for insuring said frictional engagement, and means for varying the tension of the springs, said means also arranged to move under centrifugal action to increase the friction in proportion to the increase of speed of rotation of the parts.

14. The combination of a shaft, wheel rotatable independently thereof, and having an annular friction-face, weighted arms carried by the shaft and pivoted each at one end and provided with members for engaging said face, and springs for insuring the frictional engagement of the said members and said face.

In testimony whereof I have signed my name to this specification in the presence of two subscribing witnesses.

SIMON W. WARDWELL.

Witnesses:
  ARTHUR I. HARVEY,
  THOS. M. CHILDS.